Sept. 25, 1923.　　　　S. G. LEWIS ET AL　　　1,468,881
SHOCK ABSORBER
Filed Aug. 23, 1922　　　2 Sheets-Sheet 1
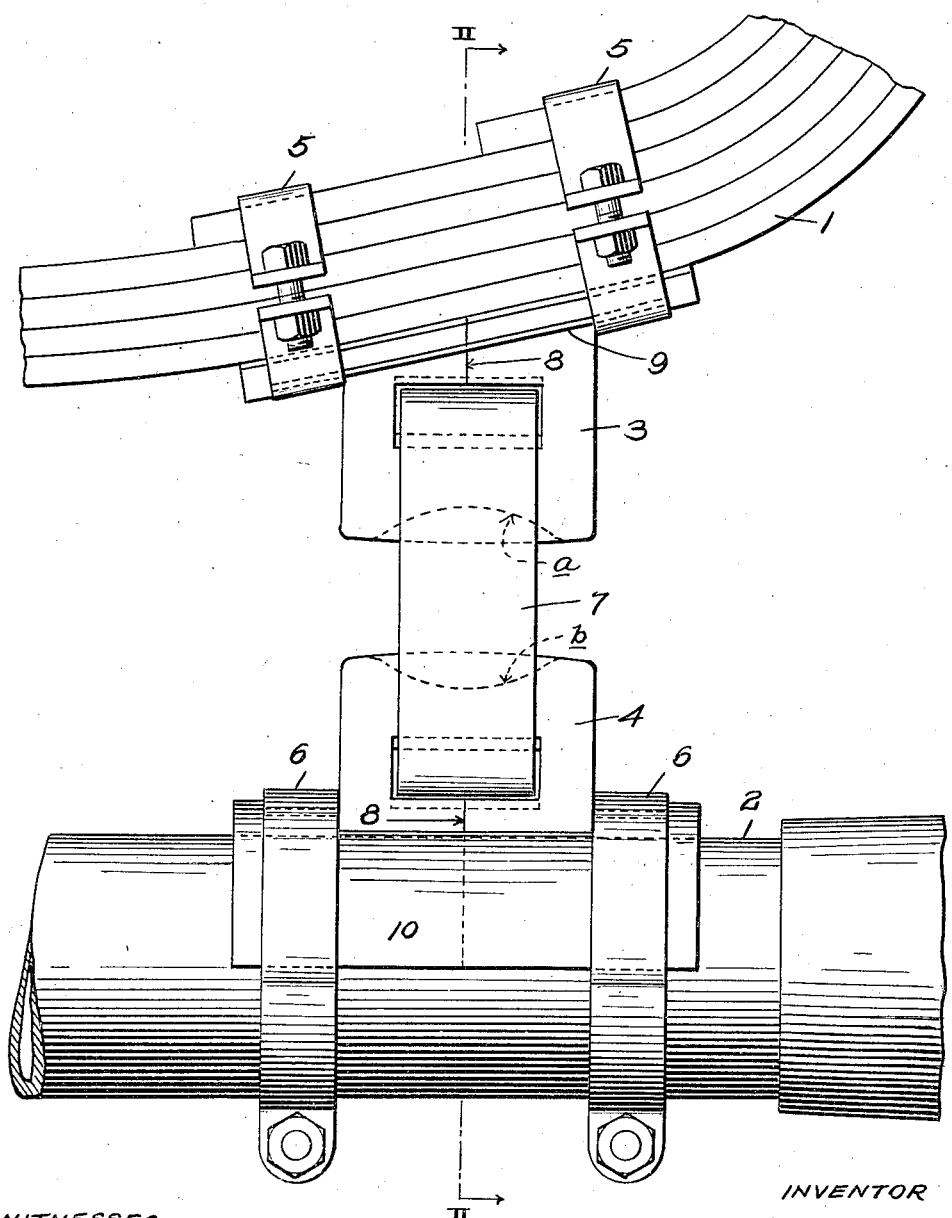
FIG.I.
WITNESSES
J. Herbert Bradley.
Harry E. Vandersyde
INVENTOR
George W Daum
Seneca G. Lewis
by Christy and Christy
their attorneys Sept. 25, 1923.                S. G. LEWIS ET AL                1,468,881
                                  SHOCK ABSORBER
                              Filed Aug. 23, 1922      2 Sheets-Sheet 2
FIG. II.
FIG. IV.
FIG. III.
FIG. V.
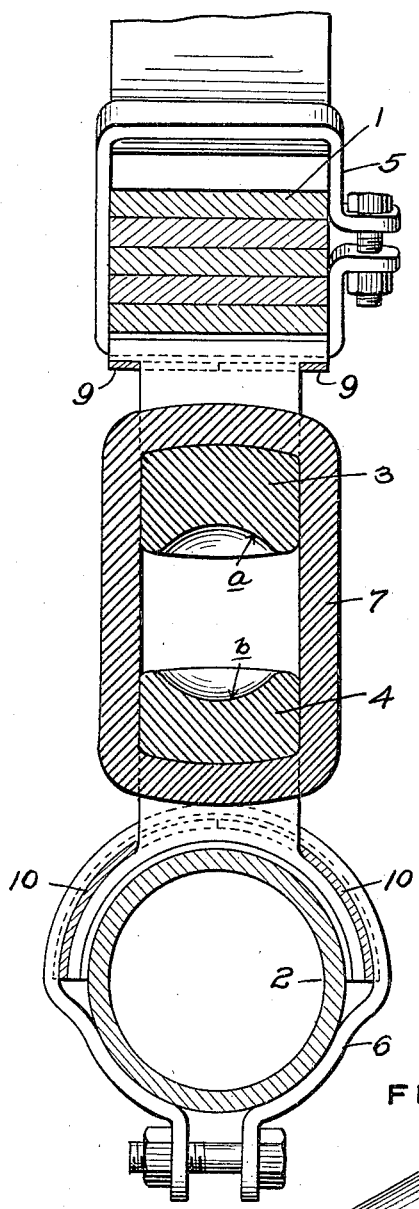
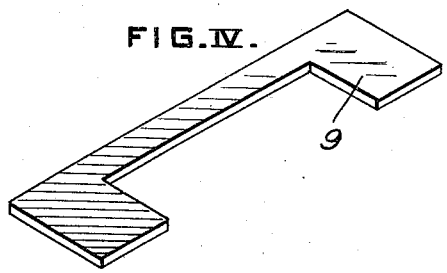
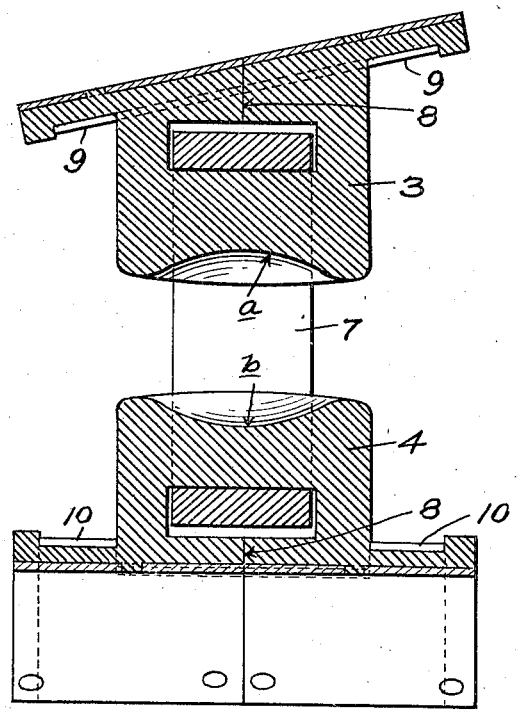
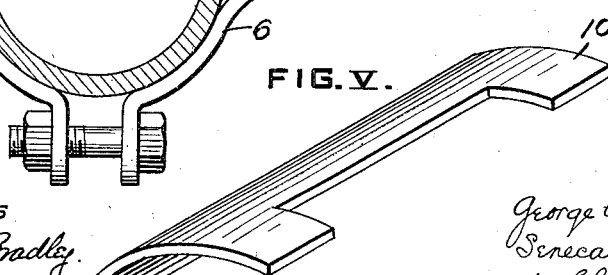
WITNESSES
J. H&hd Bradley.
Harry E. Vanderryde
INVENTOR
George W. Daum
Seneca G. Lewis
by Christy and Christy
their attorneys Patented Sept. 25, 1923.

1,468,881

UNITED STATES PATENT OFFICE.

SENECA G. LEWIS, OF GREENSBURG, AND GEORGE W. DAUM, OF JEANNETTE, PENNSYLVANIA.

SHOCK ABSORBER.

Application filed August 23, 1922. Serial No. 583,702.

*To all whom it may concern:*

Be it known that we, SENECA G. LEWIS, residing at Greensburg, in the county of Westmoreland and State of Pennsylvania, and GEORGE W. DAUM, residing at Jeannette, in the county of Westmoreland and State of Pennsylvania, citizens of the United States, have invented or discovered certain new and useful Improvements in Shock Absorbers, of which improvements the following is a specification.

Our invention relates to improvements in shock absorbers for vehicle springs.

Fig. I of the drawings shows in elevation the rear axle of an automobile and a portion of the rear spring assembled in proper space relation to the axle, and to this assembly our improved shock absorber is shown to be applied. The shock absorber is here shown in elevation. Fig. II is a view in vertical section through vehicle spring and axle assembled as in Fig. I, and through the shock absorber the plane of section is indicated by the line II—II, Fig. I. Fig. III is a view of the shock absorber alone, shown in vertical section and on a medial plane at right angles to that of Fig. II. Figs. IV and V show in perspective certain metal plates which we preferably provide and use as part of our essentially rubber shock absorber. In each complete absorber there are four such plates in all, the others being complementary in shape to the two shown.

Referring, first, to Figs. I and II, the vehicle spring is indicated at 1, the axle at 2. The shock absorber consists essentially of a pair of co-acting compression members and a tension member. The compression members are two blocks, 3 and 4, of suitable material, such as rubber, provided with suitable feet to engage, one the spring, the other the axle, whereby they may be clamped to these parts, as by the band clamps 5 and 6. Each compression member is a suitable cushioning block, essentially solid, though recessed for the purposes presently to be explained. The two members are set opposite one another, as the drawings show, and extend from the supporting members into such proximity as to afford the desired cushioning or absorbing effect when the spring 1 is compressed.

The tension member is an endless band 7, formed preferably of elastic material, ordinarily of rubber. It passes through the recesses alluded to above, formed in the bodies of the compression members 3 and 4 to receive it, and it links together the two compression members, as clearly will be seen on comparing Figs. I, II, and III. This tension member by virtue of its own elasticity added to the elasticity of the blocks 3 and 4, or by virtue of the elasticity of the blocks alone if it be itself inelastic, serves to cushion or absorb upward thrusts of the spring, in a direction away from the axle.

The openings extend transversely through blocks 3 and 4 and as here shown when the blocks are in place these openings extend transversely to the length of axle and of spring also. They are of suitable size to allow proper play of the tension member 7 in performing its described function.

The opposing faces of the compression blocks 3 and 4 are cupped, as indicated at *a* and *b*, and in their cooperation the cupped faces of these blocks meet rim to rim. When the blocks meet under stress there is a "mushrooming" of the meeting faces, and a consequent refinement in cushioning effect. Furthermore, the recoil after meeting will be diminished by the suction set up within the cups, as, after compression in rim to rim contact, their walls expand.

The tension member 7, though not necessarily so formed, is preferably an integral continuous endless link, preferably, though not necessarily, of rubber. The tension member will ordinarily be made separately, and, in order to permit of assembly the compression blocks 3 and 4 are split through their bases to the recesses within them, as is clearly indicated at 8, Figs. I and III.

The extended feet of the blocks 3 and 4 are preferably reenforced with metal plates 9 and 10 beneath the clamping bands 5 and 6. For each block 3 and 4 two plates are provided. One of the two plates for block 3 is shown in Fig. IV, and one of the two plates for block 4 is shown in Fig. V. The remaining plates are of complementary shape to the two shown. They overlie the foot portions of the two blocks, fit snugly about the body portions of the blocks, span the splits 8, and afford firm purchase for the securing bands 5 and 6. Manifestly in this matter of reenforcement of the foot members of the blocks to make secure anchorage possible, the particular arrangement we have just described is merely exemplary.

Our invention admits of latitude in construction in such matters of detail.

The securing bands 5 and 6 are preferably constrictive and are drawn tight by bolts, in the manner shown. The bands will be so particularly formed that the bolts may be arranged where they may be conveniently accessible.

As has already been explained the parts being assembled as shown in Figs. I and II, thrusts tending to collapse the spring are met and cushioned in the compression of blocks 3 and 4 one upon the other, while thrusts tending to expand the spring are met and cushioned in the stretching of the substance of blocks 3 and 4 and of the substance of tension member 7, provided the tension member be formed of elastic material.

We have described our shock absorber as for vehicles; of course there is in it nothing inherent, relating it to vehicles alone; it is applicable, wherever the condition which obtains in vehicles in service is to be met and overcome, and in vehicle service it is of course applicable to the front as well as the rear spring.

We claim as our invention:

1. A shock absorber consisting of two blocks of elastic material adapted to be secured at their bases to the parts whose relative movement is to be cushioned, and an elastic tension member extending through said blocks at points remote from their bases and linking said blocks together.

2. A shock absorber including in its structure two blocks of elastic material and a tension band also of elastic material, the said blocks being provided at their bases with extended feet and at points remote from their bases with transverse openings and being split from their bases to said openings, and means for securing said blocks by their extended feet to the parts to be cushioned, the said tension band when the parts are assembled extending within the openings in said blocks and linking said blocks together.

In testimony whereof we have hereunto set our hands.

SENECA G. LEWIS.
GEORGE W. DAUM.

Witnesses:
K. C. MATTHEWS,
R. SCHINCKE.